United States Patent
Bhan et al.

(10) Patent No.: US 9,602,558 B2
(45) Date of Patent: Mar. 21, 2017

(54) SYSTEM FOR MANAGING MULTIPLE MEETINGS USING POLICY DRIVEN RULES

(71) Applicant: Cisco Technology, Inc., San Jose, CA (US)

(72) Inventors: Vineet Bhan, San Jose, CA (US); Ashish Chotai, San Jose, CA (US); Umar Sear, Mountain House, CA (US)

(73) Assignee: Cisco Technology, Inc., San Jose, CA (US)

( * ) Notice: Subject to any disclaimer, the term of this patent is extended or adjusted under 35 U.S.C. 154(b) by 211 days.

(21) Appl. No.: 13/862,610

(22) Filed: Apr. 15, 2013

(65) Prior Publication Data

US 2014/0310352 A1 Oct. 16, 2014

(51) Int. Cl.
*G06F 15/16* (2006.01)
*H04L 29/06* (2006.01)

(52) U.S. Cl.
CPC ........ *H04L 65/403* (2013.01); *H04L 65/1083* (2013.01)

(58) Field of Classification Search
CPC ............... H04L 65/1069; H04L 65/403; H04L 12/1818; H04L 12/1822; H04L 67/22; H04L 12/1813; H04L 41/0806; H04L 43/08; H04L 43/16; H04L 67/14; H04L 29/06
USPC .................................. 709/204, 206, 224, 227
See application file for complete search history.

(56) References Cited

U.S. PATENT DOCUMENTS

| | | | |
|---|---|---|---|
| 6,025,870 A * | 2/2000 | Hardy | H04N 5/77 348/14.1 |
| 6,724,403 B1 | 4/2004 | Santoro et al. | |
| 7,412,392 B1 | 8/2008 | Satapathy | |
| 7,679,638 B2 | 3/2010 | Eshkoli et al. | |
| 8,300,078 B2 | 10/2012 | Lovhaugen et al. | |
| 8,483,098 B2 | 7/2013 | Vadlakonda et al. | |
| 8,520,821 B2 * | 8/2013 | Alexandrov et al. | 379/202.01 |
| 8,819,129 B1 * | 8/2014 | Cyriac | H04L 65/1046 709/204 |
| 8,908,843 B2 * | 12/2014 | Manor | 379/202.01 |
| 2003/0090506 A1 * | 5/2003 | Moore | G06T 13/80 715/730 |
| 2007/0150583 A1 * | 6/2007 | Asthana et al. | 709/224 |
| 2008/0040187 A1 * | 2/2008 | Carraher | G06Q 10/109 705/7.19 |
| 2008/0243582 A1 * | 10/2008 | Chen | G06Q 10/06314 705/7.19 |
| 2009/0210494 A1 * | 8/2009 | Fisher et al. | 709/205 |

(Continued)

*Primary Examiner* — Benjamin M Thieu
(74) *Attorney, Agent, or Firm* — P. Su

(57) ABSTRACT

In one embodiment, a method includes supporting a participation of a first endpoint in a first session and identifying a first time when a second session is to begin, where the first endpoint is expected to participate in the second session. The method also includes determining whether the first endpoint is still participating in the first session at approximately the first time, identifying a first condition when it is determined that the first endpoint is still participating in the first session at approximately the first time, and determining when the first condition is met while supporting the participation of the first endpoint in the first session. Finally, the method includes causing the first endpoint to switch to participating in the second session when it is determined that the first condition is met.

11 Claims, 10 Drawing Sheets

(56) References Cited

U.S. PATENT DOCUMENTS

| | | | |
|---|---|---|---|
| 2010/0085416 A1* | 4/2010 | Hegde | H04N 7/157 348/14.08 |
| 2011/0022968 A1* | 1/2011 | Conner et al. | 715/753 |
| 2012/0229593 A1 | 9/2012 | Liu et al. | |
| 2012/0246229 A1* | 9/2012 | Carr et al. | 709/204 |
| 2013/0100237 A1* | 4/2013 | Zeng | H04N 7/14 348/14.08 |
| 2013/0293665 A1* | 11/2013 | Pang | H04M 3/42195 348/14.08 |
| 2014/0123027 A1* | 5/2014 | Kozloski et al. | 715/753 |

* cited by examiner

US 9,602,558 B2

SYSTEM FOR MANAGING MULTIPLE MEETINGS USING POLICY DRIVEN RULES

TECHNICAL FIELD

The disclosure relates generally to conferencing systems. More particularly, the disclosure relates to allowing a participant in a first conference session to join a second, overlapping conference session when certain policy driven conditions are met, and to remain a participant in the first conference session until the certain policy driven conditions are met.

BACKGROUND

A scheduled meeting such as a scheduled virtual meeting typically has an anticipated ending time, i.e., a time at which the scheduled meeting is expected to end. Often, a meeting may run over its scheduled, or anticipated, ending time. When a meeting has a duration that is longer than expected, the meeting may extend into time allotted for another scheduled meeting.

Meeting participants, e.g., executives of an enterprise, often have back-to-back meetings. When an earlier meeting runs over its scheduled time, the earlier meeting may still be running when a later meeting has already begun. A participant may leave an earlier meeting that is still in progress to participate in a later meeting, and then discover that key participants are not yet in attendance with respect to the later meeting. When a participant leaves a first meeting that has run over its allotted time in order to participate in a second meeting and effectively determines that it would have been more productive to remain in the first meeting because nothing is happening in the second meeting, the participant may be left frustrated.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
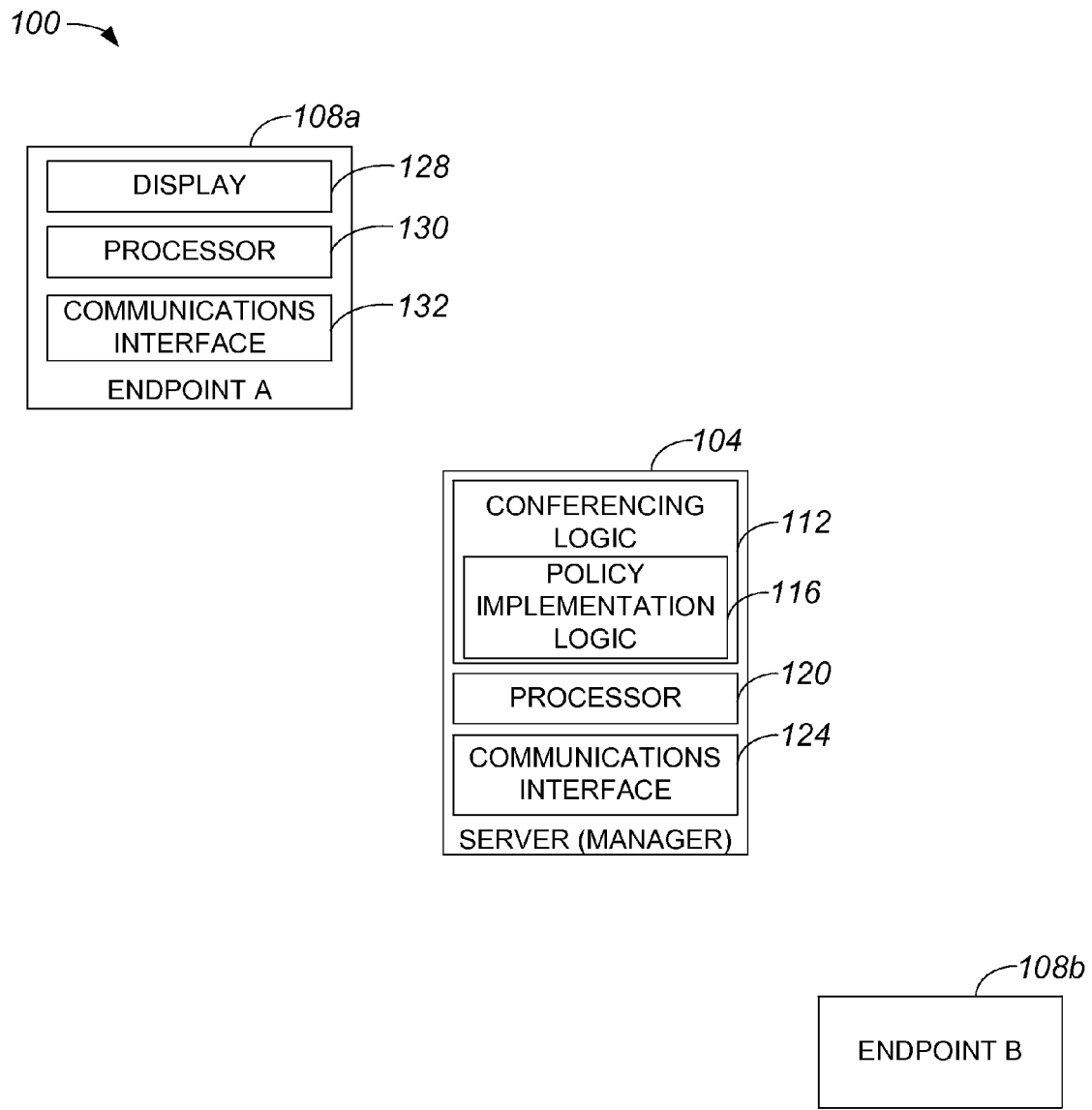
FIG. 1 is a block diagram representation of an overall system in which a conference server or manager is configured to enable a conference participant to determine when to join a meeting in an intelligent manner in accordance with an embodiment.

According to one aspect, a method includes supporting a participation of a first endpoint in a first session and identifying a first time when a second session is to begin, where the first endpoint is expected to participate in the second session. The method also includes determining whether the first endpoint is still participating in the first session at approximately the first time, identifying a first condition when it is determined that the first endpoint is still participating in the first session at approximately the first time, and determining when the first condition is met while supporting the participation of the first endpoint in the first session. Finally, the method includes causing the first endpoint to switch to participating in the second session when it is determined that the first condition is met.

Description

Participants in meetings, particularly executives within an enterprise, often have back-to-back meetings scheduled. An earlier meeting may run over its scheduled ending time such that the earlier meeting may still be running when a later meeting has already begun. When a participant leaves an earlier meeting that is still in progress to participate in a later meeting, and then discovers that it may have been more productive to remain in the earlier meeting, e.g., because key participants are not yet in attendance at the later meeting, the participant may feel that he or she has wasted valuable time.

By allowing a participant to intelligently determine when to cease participating in an earlier meeting that has run over its allotted time to join a later meeting, the participant may efficiently use his or her time. For example, if a participant continues to participate in a first meeting that has run past a start time for a second meeting until a key event has occurred with respect to the second meeting, then the participant may efficiently utilizes his or her time by participating in the first meeting rather than waiting for the second meeting to effectively become productive. The key event may be related to, but is not limited to being related to, to a certain percentage of invited participants joining and participating in the second meeting, a particular key participant joining and participating in the second meeting, and/or a presentation being shared in the second meeting In one embodiment, an invited participant to a meeting may specify rules or conditions that are to be met before he or she participates in the meeting. Such rules or conditions may generally apply with respect to a second meeting when an invited participant is participating in a first meeting when the second meeting is either about to start or has started. The invited participant may continue to participate in the first meeting until at least one of the rules or conditions is met. That is, the invited participant may continue to participate in the first meeting unless a switch is effectively triggered. When a party may continue to participate in a first meeting until a particular condition or event occurs with respect to a second meeting, the party may manage his or her time more efficiently. As a result, productivity, as well as the satisfaction of the party or customer satisfaction, may be increased.

A server, e.g., a conference server, may be arranged to automatically switch a party from participating in a first meeting to participating in a second meeting when a particular condition or even occurs with respect to the second meeting. That is, a server may determine when to switch a party from participating in a first meeting to participating in a second meeting, and may automatically cause the party to join in and participate in the second meeting. Alternatively, however, a server may determine when a condition is such that a party may wish to switch from participating in a first meeting to participating in a second meeting, and may support allowing the party to determine when to effectuate such a switch based on the condition.

A party may join a second meeting while participating in a first meeting such that the party may receive media streams associated with the second meeting while the first meeting is in progress. However, while the party may join a second meeting while he or she is still participating in the first meeting, the party generally may not actively participate in, or actively attend, the second meeting until the party switches from participating in the first meeting to participating in the second meeting. In general, when a party joins a meeting or a session, e.g., a virtual meeting the party may manually log into, e.g., by entering a password, or be automatically logged into the meeting, the party may be provided with data associated with the meeting. The party may be joined in more than one meeting, but may not participate in, e.g., speak in and/or make a presentation in, more than one meeting at a time. When a party is participating in a meeting, the party may be in attendance at the meeting and active with respect to the meeting.

Referring initially to FIG. 1, an overall system in which a conference server or manager is configured to enable a conference participant to determine when to join a meeting or, more generally, a session in an intelligent manner will be described in accordance with an embodiment. A network 100 includes a server 104 and endpoints 108a, 108b that are arranged to communicate, e.g., through wired and/or wireless communications channels (not shown). Server 104 may generally be any network element that is configured to support sessions, e.g., virtual conferences or meetings. By way of example, server 104 may be a conference server, a conductor, or a multipoint control unit (MCU) that is part of an overall conferencing network. Endpoints 108a, 108b are typically user-portals or devices, e.g., computing devices that support conference sessions such as telepresence sessions, which are used by parties to participate in sessions supported by server 104.

Server 104 includes a communications interface 124 that is arranged to enable server 104 to communicate with, e.g., provide data to and obtain data from, endpoints 108a, 108b. Communications interface 124 may include at least one input/output (I/O) port (not shown). Server 104 also includes a processor 120 and conferencing logic 112. Conferencing logic 112 may include hardware and/or software logic that is configured to allow server 104 to support sessions, e.g., virtual conference sessions, involving endpoints 108a, 108b. Processor 120 may execute software logic included in conferencing logic 112.

Conferencing logic 112 generally supports the establishment and maintenance of sessions in which endpoint 108a and/or endpoint 108b may each participate. Policy implementation logic 116, which is included in conferencing logic 112, is generally configured to obtain policies, e.g., rules and/or conditions, from parties associated with endpoints 108a, and to effectively implement the policies. In one embodiment, policy implementation logic 116 implements policies that allow a user of an endpoint, e.g., endpoint A 108a, to remain a participant in a first session supported by server 104 until it is determined, based upon the policies, that the user of endpoint A 108a is to begin participating in a second session. Policy implementation logic 116 is also configured to facilitate causing endpoint A 108a to switch from participating in a first session to participating in a second session once it is determined that the user of endpoint A 108a is to begin participating in the second session. Typically, policy implementation logic 116 may cause endpoint A 108a to log out of a first session when causing endpoint A 108a to switch to participating in a second session.

Endpoints 108a, 108b may be computing devices, as previously mentioned. In generally, an endpoint such as endpoint A 108a may include a display 128 on which a media stream associated with a session may be rendered, a processor 130, and a communications interface 132 that allows endpoint A 108a to send information to and receive information from server 104.

In one embodiment, a party may be joined, e.g., effectively logged into, a second meeting while participating in, e.g., currently attending, a first meeting. It should be appreciated that a participant may continue to participate in a first meeting until a condition is met with respect to the second meeting, at which time the participant may switch from participating in the first meeting to participating in the second meeting. Such a switch may either be automatic or manual upon a "switching condition" or a "triggering condition" being met or exceeded. That is, a participant may be automatically switched to participating in a second meeting or the participant may be provided with an interface which allows the participant to elect to participate in the second meeting once a particular condition is met or exceeded.

Figure 2:
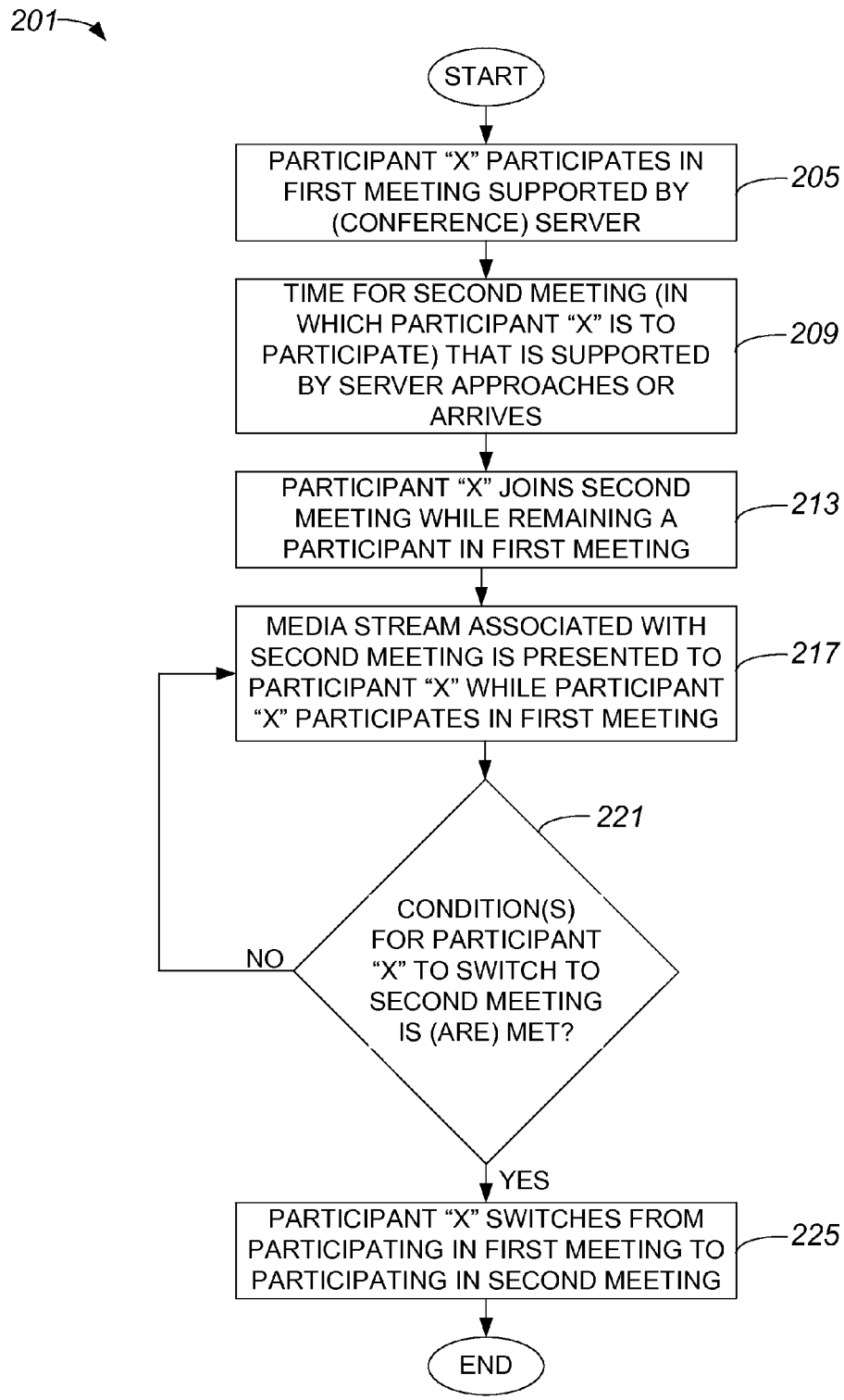
FIG. 2 is a process flow diagram which illustrates a method of switching to participating in a second meeting in which a participant is joined in both a first meeting and the second meeting prior to switching to participating in the second meeting in accordance with an embodiment.

FIG. 2 is a process flow diagram which illustrates a method of switching to participating in a second meeting in which a participant is joined in both a first meeting and the second meeting prior to switching to participating in the second meeting in accordance with an embodiment. A method 201 of switching to participating in a second meeting begins at step 205 in which a participant, e.g., participant "X", participates in a first meeting supported by a server, e.g., a conference server such as a telepresence server that supports unified conferencing. When participant "X" participates in the first meeting, participant "X" is generally logged into the first meeting and is currently attending the first meeting. Typically, when participant "X" participates in the first meeting, an endpoint used by participant "X" may receive a media stream associated with the first meeting, i.e., a first media stream. By way of example, a media stream associated with the first meeting may allow information associated with the first meeting to be visually rendered on a display screen of an endpoint used by participant "X" and may allow other information associated with the first meeting to be rendered as audio and/or video using the endpoint used by participant "X".

In step 209, a time at which a second meeting is to start is identified as approaching or having arrived, while participant "X" is still participating in the first meeting. The second meeting is a meeting in which participant "X" is expected to participate, e.g., a meeting for which participant "X" is an invited or scheduled participant. When the time at which the second meeting is identified as approaching or having arrived, participant "X" joins the second meeting while remaining a participant in the first meeting in step 213. It should be appreciated that when participant "X" joins the second meeting, participant "X" may log into the second meeting while not participating in the second meeting. It should be appreciated that participant "X" may be automatically logged into the second meeting or participant "X" may manually log himself or herself into the second meeting.

Once participant "X" joins the second meeting while remaining a participant in the first meeting, a media stream associated with the second meeting may be obtained and presented to participant "X" in step 217. The media stream associated with the second meeting, i.e., a second media stream, may be presented to participant "X" using any suitable method. Suitable methods include, but are not limited to including, rendering the second media stream as a picture-in-picture (PIP) window while rendering the first media stream in a main window of a display screen, and rendering the second media stream as a pop-up window while rendering the first media stream in a main window of a display screen.

After the media stream associated with the second meeting is presented or otherwise rendered, a determination is made in step 221 as to whether a condition for participant "X" to switch from participating in the first meeting to participating in the second meeting is met. That is, it is determined in step 221 whether a switching condition is met. The condition may generally be a rule and/or a prerequisite that has been specified by participant "X" that effectively identifies a circumstance under which participant "X" wishes to begin participating in, or actively attending, the second meeting. The condition may be, but is not limited to being, a condition associated with a number of participants who are actively participating in the second meeting, a condition associated with the participation of a particular party in the second meeting, and/or a condition associated with the sharing of a presentation in the course of the second meeting.

If it is determined in step 221 that a condition for participant "X" to switch to participating in the second meeting is not met, then process flow returns to step 217 in which the media stream associated with the second meeting is presented to participant "X" while participant "X" continues to participate in the first meeting. In general, more than one condition may be specified such that if at least one condition is met or exceeded in step 221, the determination is that participant "X" is to switch to participating in the second meeting. If the determination in step 221 is that a condition for participant "X" to switch to participating in the second meeting is met, then process flow proceeds to step 225 in which participant "X" switches from participating in the first meeting to participating in the second meeting. The switch from participating in the first meeting to participating in the second meeting may occur substantially automatically upon a condition being met in step 221, and may be facilitated by the server. It should be understood that the switch from participating in the first meeting to participating in the second meeting may also occur substantially manually, e.g., participant "X" may be notified that a condition has been met and be prompted to take an action to cause participant "X" to participate in the second meeting. After participant "X" switches from participating in the first meeting to participating in the second meeting, the method of switching to participating in a second meeting is completed.

Figure 3:
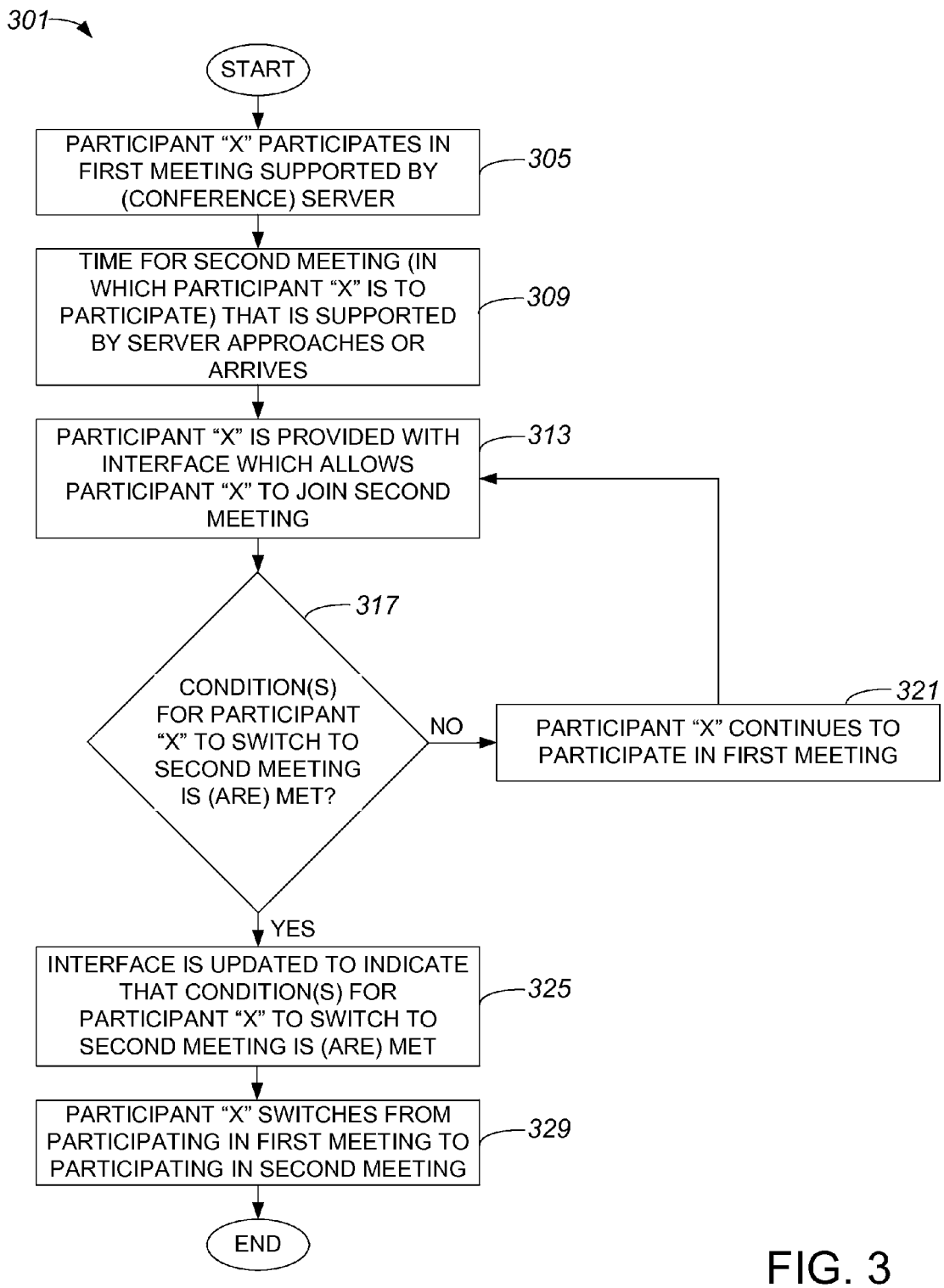
FIG. 3 process flow diagram which illustrates a method of switching to participating in a second meeting in which a participant is joined in the second meeting once a triggering condition is met in accordance with an embodiment.

In lieu of a participant joining a second meeting at approximately a time at which the second meeting is scheduled to start while the participant participates in a first meeting, a participant may instead join a second meeting after a condition, e.g., a switching or a triggering condition, is met. FIG. 3 process flow diagram which illustrates a method of switching to participating in a second meeting in which a participant is joined in the second meeting once a triggering condition is met in accordance with an embodiment. A method 301 of switching to participating in a second meeting begins at step 205 in which a participant, e.g., participant "X", participates in a first meeting supported by a server. When participant "X" participates in the first meeting, participant "X" is generally logged into the first meeting and is currently attending the first meeting. When participant "X" participates in the first meeting, an endpoint used by participant "X" typically receives a media stream associated with the first meeting, i.e., a first media stream, from a server.

A time at which a second meeting is to start is identified as approaching or having arrived in step 309, while participant "X" is still participating in the first meeting. The second meeting is a meeting in which participant "X" is expected to participate, e.g., a meeting for which participant "X" is an invited or scheduled participant. In step 313, participant "X" is provide with an interface which allows participant "X" to join the second meeting. The interface may be a window displayed on a display screen with a link or a button that participant "X" may activate to join the second meeting.

A determination is made in step 317 as to whether a condition for participant "X" to switch from participating in the first meeting to participating in the second meeting is met. The condition may vary widely and may include, but is not limited to including, identifying participants in the second meeting and/or identifying sharing of a presentation during the second meeting. If the determination is that a condition for participant "X" to switch to participating in the second meeting is not met, then process flow moves to step 321 in which participant "X" continues to participate in the first meeting. From step 321, process flow returns to step 313 in which participant "X" continues to be provided with an interface arranged to allow participant "X" to join the second meeting.

Alternatively, if it is determined in step 317 that a condition for participant "X" to switch to participating in the second meeting is met, then the indication is that participant "X" is to switch to participating in the second meeting. Accordingly, the interface provided in step 313 may be updated to indicate that the condition for participant "X" to switch to participating in the second meeting is met. In one embodiment, if the switching condition or a triggering condition is associated with a percentage of invited participants who are currently participating in the second meeting, the interface may be updated to indicate the percentage.

From step 325, process flow moves to step 329 in which participant "X" switches from participating in the first meeting to participating in the second meeting. It should be appreciated that the switch to participating in the second meeting may occur substantially automatically, or may occur manually. In one embodiment, when participant "X" switches from participating in the first meeting to participating in the second meeting, participant "X" may be substantially automatically dropped, e.g., logged out of, the first meeting by the server. Once participant "X" switches from participating in the first meeting to participating in the second meeting, the method of switching to participating in the second meeting is completed.

Figure 4:
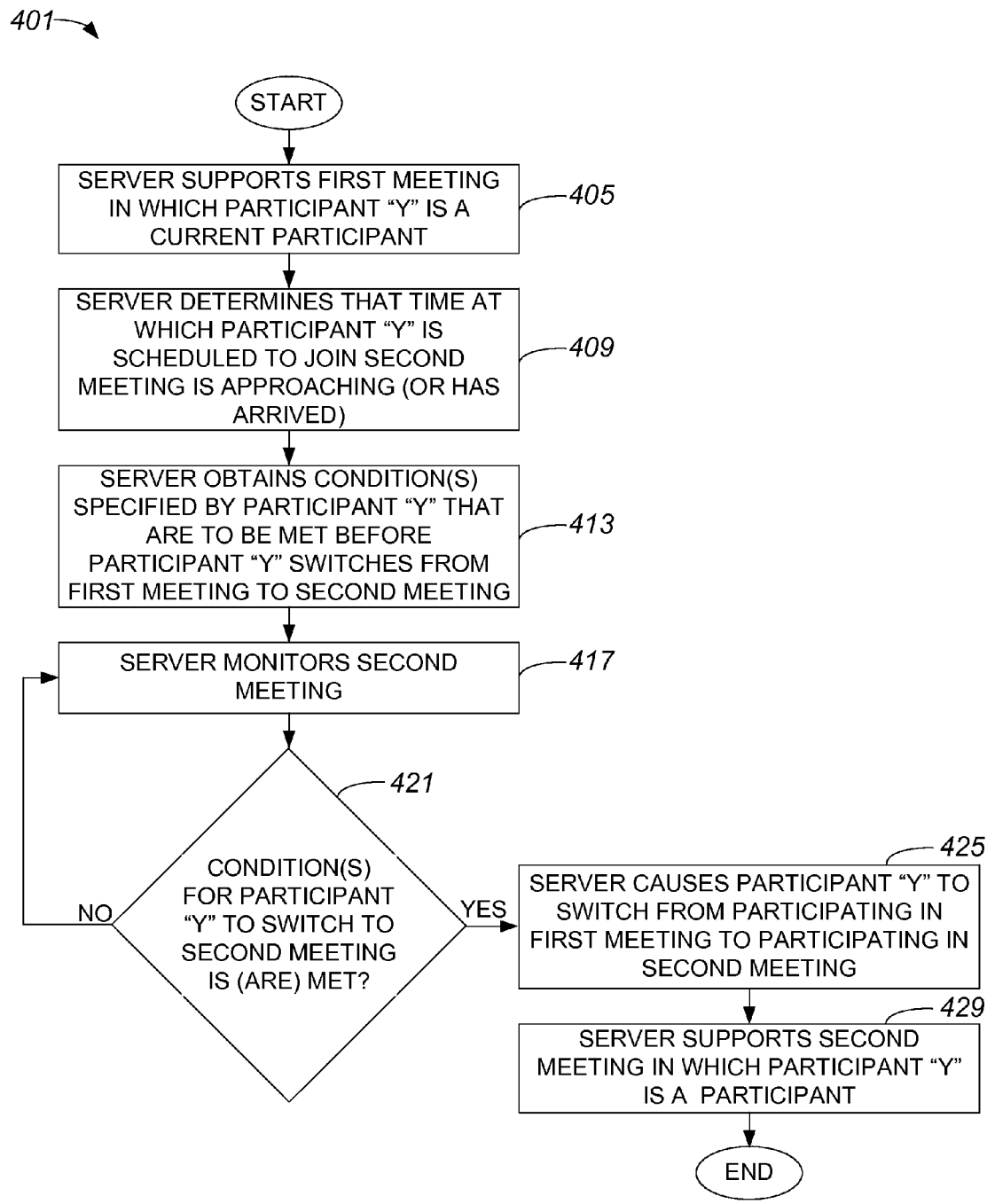
FIG. 4 is a process flow diagram which illustrates a method of determining when a condition for a participant to switch from participating in a first meeting to participating in a second meeting is met in accordance with an embodiment.

Referring next to FIG. 4, a method of switching a participant from participating in a first meeting to participating in a second meeting will be described from the point of view of a server, e.g., a conference server, in accordance with an embodiment. A method 401 of switching a participant from participating in a first meeting to participating in a second meeting begins at step 405 in which a server support a first meeting in which participant "Y" is a current participant. The server may support the first meeting or session by consolidating media streams from participant "Y" and other participants in the first meeting into a consolidated media stream, and providing the consolidated media stream to participant "Y" and other participants. The server may also generally support the first meeting by monitoring activities during the first meeting and/or keeping track of participant "Y" and other participants.

In step 409, the server determines that a time at which participant "Y" is scheduled to join a second meeting has approached or has arrived. It should be appreciated that, in the described embodiment, participant "Y" is still participating in the first meeting when the time at which participant "Y" is to join the second meeting approaches or has arrived.

After the time at which participant "Y" is to join the second meeting approaches or has arrived, the server obtains a condition in step 413 that is specified by participant "Y", and is to be met before participant "Y" switches from participating in the first meeting to participating in the second meeting. It should be appreciated that the server may optionally cause participant "Y" to join, e.g., to log into, the second meeting. The condition may be obtained by the server from a data store in which preferences of participant "Y" with respect to the second meeting are stored. In general, the server may obtain any number of conditions associated with preferences of participant "Y" with respect to the second meeting.

Once the condition specified by participant "Y" is obtained, the server monitors the second meeting in step 417. Monitoring the second meeting may include, but is not limited to including, identifying current participants in the second meeting, determining a percentage of invited participants who are current participants in the second meeting, and/or determining when a presentation is shared during the second meeting.

It is determined in step 421 whether a condition for participant "Y" to switch to participating in the second meeting is met. If the determination is that a condition for participant "Y" to switch to participating in the second meeting is not met, then process flow returns to step 417 in which the server continues to monitor the second meeting. Alternatively, if the determination is that a condition for participant "Y" to switch to participating in the second meeting is met, then the server causes participant "Y" to switch from participating in the first meeting to participating in the second meeting in step 425. The server may cause participant "Y" to automatically switch to participating in the second meeting, or the server may effectively prompt participant "Y" to initiate a switch to participating in the second meeting. After the server causes participant "Y" to switch from participating in the first meeting to participating in the second meeting, the server supports the second meeting in which participant "Y" is a participant, and the method of switching a participant from participating in a first meeting to participating in a second meeting is completed.

Figure 5:
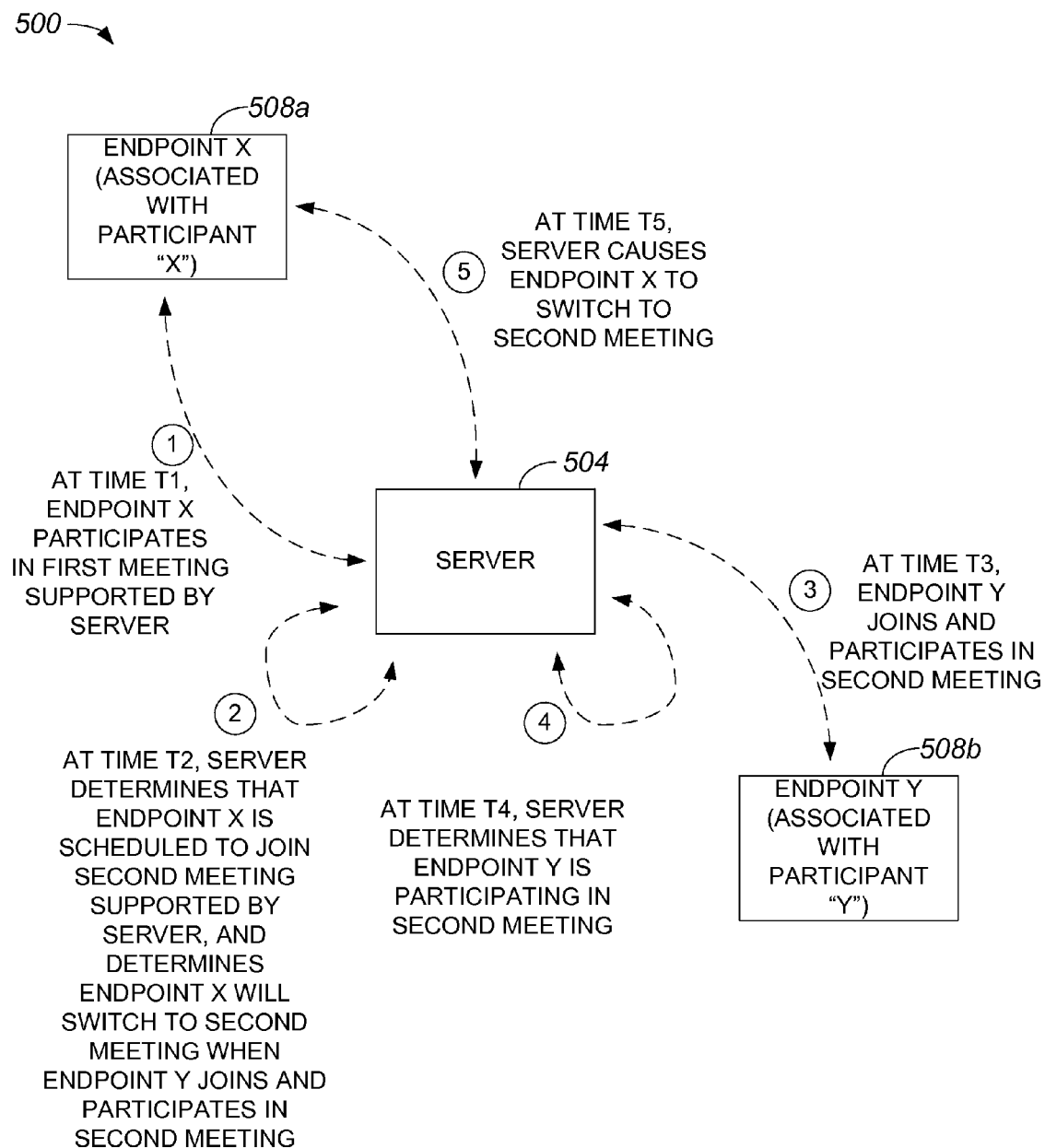
FIG. 5 is a diagrammatic representation of an overall network in which a participant in a first meeting specifies that he or she will switch to a second meeting after a particular participant joins the second meeting in accordance with an embodiment.

As previously mentioned, a condition under which a party may switch from participating in a first meeting, which runs past a starting time of a second meeting, to participating in the second meeting may vary widely. With reference to FIG. 5, an overall network in which a party that is a participant in a first meeting specifies that he or she will switch to a second meeting after a particular party joins the second meeting will be described in accordance with an embodiment. An overall network 500 includes a server 504, a first endpoint 508a, and a second endpoint 508b. First endpoint 508a is an endpoint used by participant "X", while second endpoint 508b is an endpoint used by participant "Y".

In the described embodiment, participant "X" has effectively specified a rule or condition which indicates that if participant "X", or first endpoint 508a, is currently participating in a first meeting that is still in progress when a second meeting commences, participant "X" will not participate in the second meeting until participant "Y", or second endpoint 508b, has been identified as participating in the second meeting. That is, participant "X" will continue to participate in a first meeting that has run over its scheduled time, rather than participate in a second meeting that has started, until participant "Y" is in attendance at the second meeting.

At a time T1, first endpoint 508a is participating in a first meeting that is supported by server 504. At a time T2, server 504 determines that first endpoint 508a is scheduled to join a second meeting supported by server 504. Additionally, server 504 also determines that first endpoint 508a has specified a condition for switching to participating in the second meeting, e.g., that first endpoint 508a will not switch from participating in the first meeting to participating in the second meeting until second endpoint 508b is identified as being attendance at the second meeting. In one embodiment, first endpoint 508a may essentially join the second meeting such that first endpoint 508a may receive a media stream associated with the second meeting, while continuing to participate in the first meeting.

At a time T3, second endpoint 508b joins the second meeting and begins participating in the second meeting. The server determines, at a time T4, that second endpoint 508b is participating in the second meeting. As such, at a time T5, the server causes first endpoint 508a to switch from participating in the first meeting to participating in the second meeting. In causing first endpoint 508a to switch to the second meeting, server 504 may automatically log first endpoint 508a into the second meeting, or server 504 may prompt first endpoint 508a to log into the second meeting. It should be appreciated that if first endpoint 508a has already been logged into the second meeting, then switching first endpoint 508a to participating in the second meeting may not include logging first endpoint 508a into the second meeting. Typically, switching first endpoint 508a from participating in the first meeting to participating in the second meeting may include logging first endpoint 508a out of the first meeting or otherwise disconnecting first endpoint 508a from the first meeting.

Figure 6:
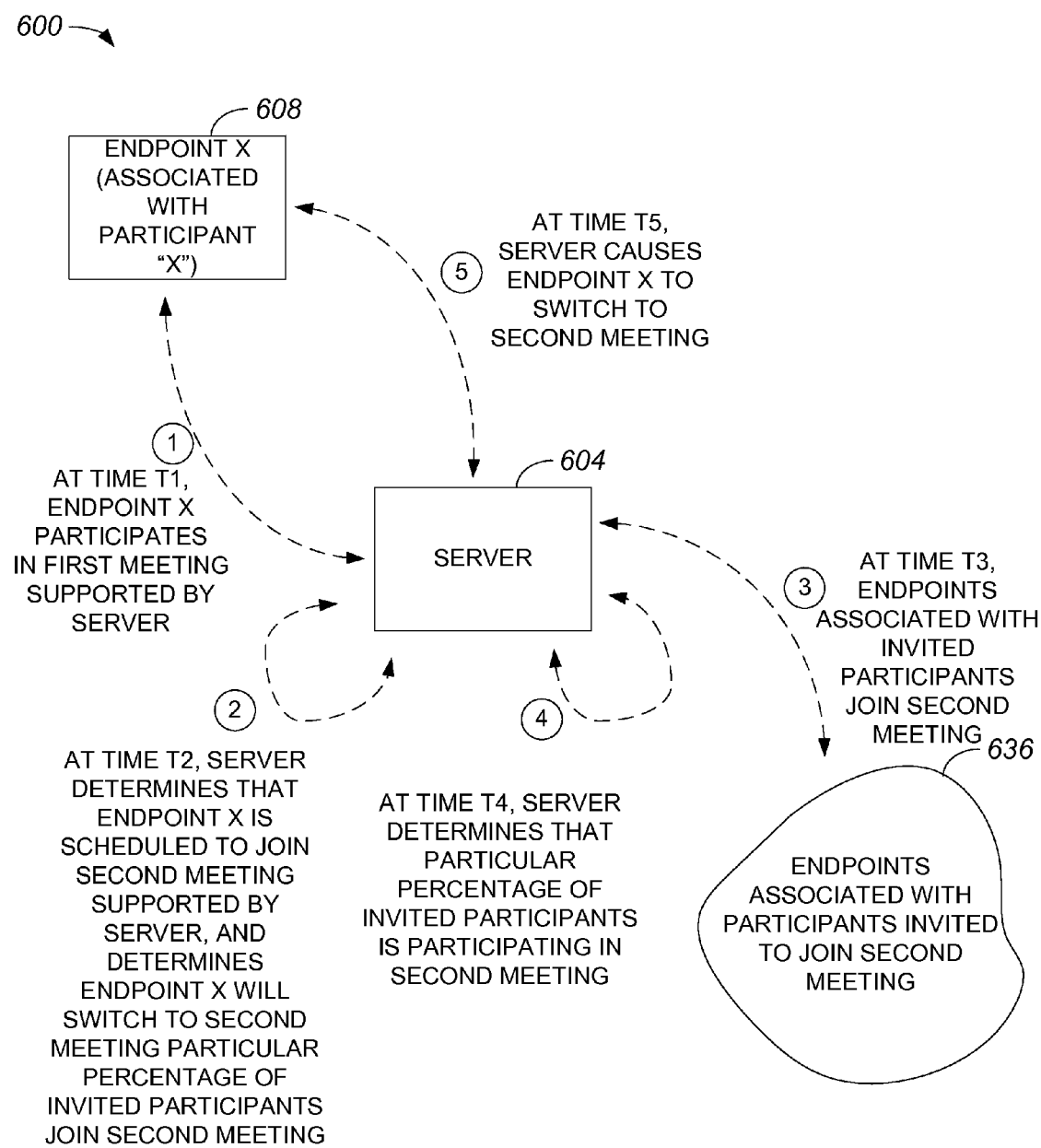
FIG. 6 is a diagrammatic representation of an overall network in which a participant in a first meeting specifies that he or she will switch to a second meeting after a particular percentage of invited participants joins the second meeting in accordance with an embodiment.

FIG. 6 is a diagrammatic representation of an overall network in which a participant in a first meeting specifies that he or she will switch from participating in a first meeting to participating in a second meeting after a particular percentage of invited participants joins the second meeting in accordance with an embodiment. An overall network 600 includes a server 604, a first endpoint 608, and a plurality of endpoints 636. First endpoint 608 is an endpoint used by participant "X", while plurality of endpoints 636 includes endpoints associated with other participants.

A rule or condition specified by participant "X" indicates that if participant "X", or first endpoint 608, is currently participating in a first meeting that is still in progress when a second meeting commences, participant "X" will not participate in the second meeting until a certain percentage of endpoints 636 associated with participants invited to the second meeting is identified as attending or participating in the second meeting. That is, participant "X" will continue to participate in a first meeting that has run over its scheduled time and into a scheduled time for a second meeting, rather than participate in the second meeting, until a certain, particular percentage of invited participants is identified as being in attendance at the second meeting. The particular percentage may vary widely, e.g., participant "X" may specify that he or she will not participate in the second meeting until at least approximately twenty-five percent of invited participants are already participating in the second meeting.

At a time T1, first endpoint 608 is participating in a first meeting that is supported by server 604. At a time T2, server 604 determines that first endpoint 608 is scheduled to join a second meeting supported by server 604, although first endpoint 608 is still participating in the first meeting. Server 604 also determines at time T2 that first endpoint 608 has specified a condition for switching to participating in the second meeting, e.g., that first endpoint 608 will not switch from participating in the first meeting to participating in the second meeting until a certain percentage of endpoints 636 is identified as participating in the second meeting.

At a time T3 and after, endpoints 636 join the second meeting and begin participating in the second meeting. It should be appreciated that any number of endpoints 636 may generally join and participate in the second meeting, and that server 604 may monitor how many endpoints 636 join and participate in the second meeting. The server determines, at a time T4, that the condition specified by participant "X" with respect to when participant "X" will switch from participating in the first meeting to participating in the second meeting has been met. In the described embodiment, server 604 determines that time T4 that a particular percentage of invited participants, e.g., endpoints 636, is participating in the second meeting. At a time T5, server 604 causes first endpoint 608 to switch from participating in the first meeting to participating in the second meeting.

Figure 7:
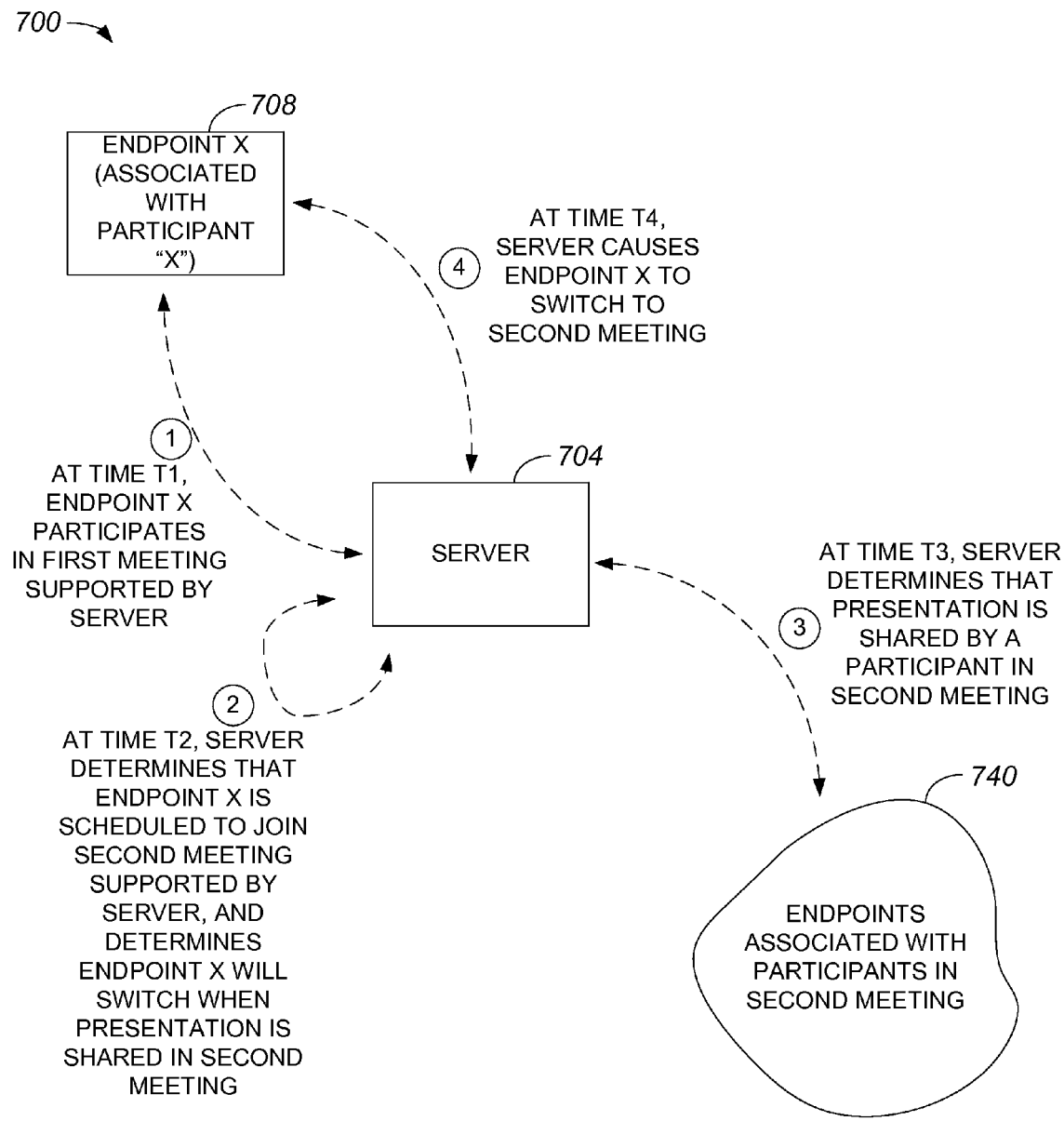
FIG. 7 is a diagrammatic representation of an overall network in which a participant in a first meeting specifies that he or she will switch to a second meeting after a presentation is shared with respect to the second meeting in accordance with an embodiment.

In one embodiment, a party may specify that he or she will continue to participate in a first meeting, e.g., a first meeting that has run over its initial time allocation into a time allocation for a second meeting, until a presentation is shared in the course of the second meeting. A shared presentation may include, but is not limited to including, a video presentation, a multimedia presentation, a slide presentation, and/or a presentation of a desktop. FIG. 7 is a diagrammatic representation of an overall network in which a participant in a first meeting specifies that he or she will switch to a second meeting after a presentation is shared with respect to the second meeting in accordance with an embodiment. An overall network 700 includes a server 704, a first endpoint 708, and any number of additional endpoints 740. First endpoint 708 is an endpoint used by participant "X", while endpoints 740 are used by other parties.

In the described embodiment, participant "X" has effectively specified a rule or condition which indicates that if participant "X", or first endpoint 708, is currently participating in a first meeting that is still in progress when a second meeting commences, participant "X" will not participate in the second meeting until participant server 704 has identified that a presentation is shared with respect to the second meeting. In other words, participant "X" will continue to participate in a first meeting that has run over its scheduled time, rather than participate in a second meeting that has started, until one of endpoints 740 is used to share a presentation in the second meeting.

At a time T1, first endpoint 708 is participating in a first meeting that is supported by server 704. At a time T2, server 704 determines that first endpoint 708 is scheduled to join a second meeting supported by server 704. In addition, server 704 also determines that first endpoint 708 has specified a condition for switching to participating in the second meeting, e.g., that first endpoint 708 will not switch from participating in the first meeting to participating in the second meeting until it is determined that a presentation is shared by one of endpoints 740.

At a time T3, it is determined, as for example by server 704, that a presentation is being shared in the second meeting. As such, at time T4, server 704 effectively causes first endpoint 708 to switch from participating in the first meeting to participating in the second meeting.

Figure 8:
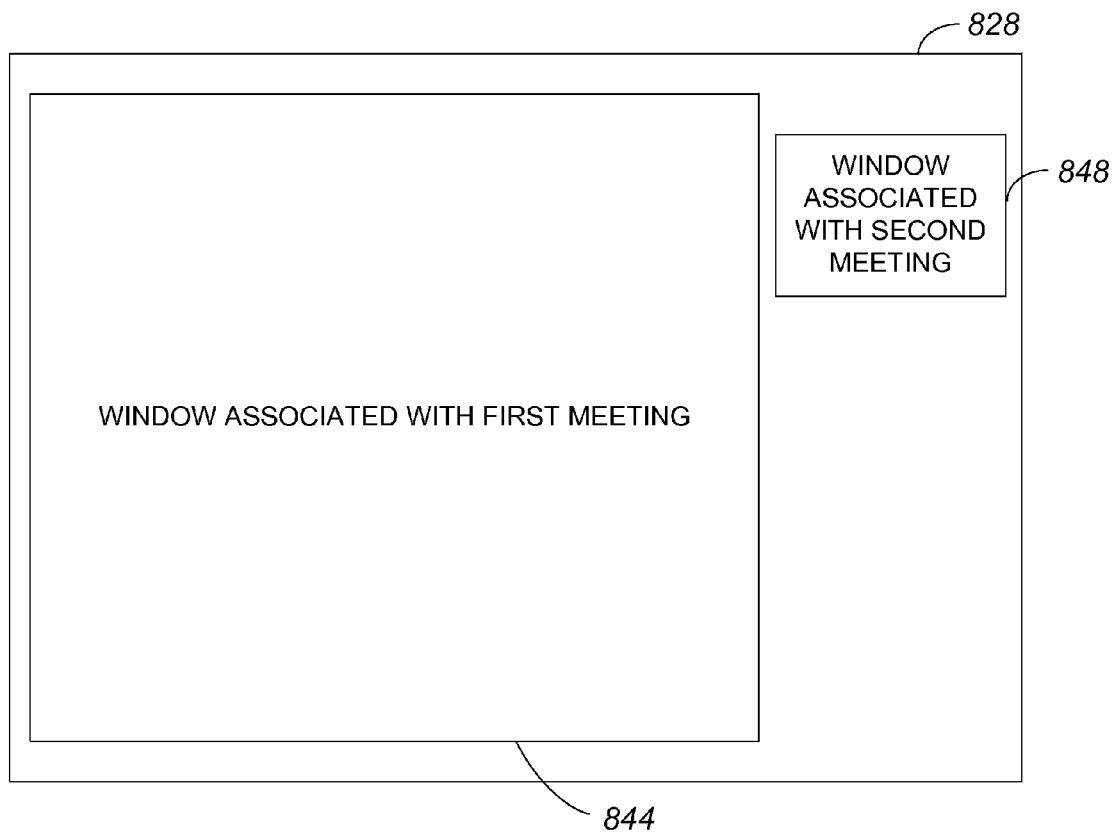
FIG. 8 is a diagrammatic representation of a display screen of an endpoint on which media associated with a second meeting is displayed with media associated with a first meeting in which the endpoint is participating in accordance with an embodiment.

As mentioned above, when a participant in a first meeting that exceeds its allocated time is provided with a media stream associated with a second meeting the participant is scheduled to attend, the media stream may be presented to the participant. In one embodiment, the media stream for the second meeting may be presented in a window, e.g., a PIP window, on a display screen associated with the participant. FIG. 8 is a diagrammatic representation of a display screen of an endpoint on which media associated with a second meeting is displayed with media associated with a first meeting in which the endpoint is participating in accordance with an embodiment. A display screen 828 includes a first window 844 and a second window 848. First window 844 is associated with a first meeting, or an in-progress meeting that a user of display screen 828 is currently attending or participating in. In general, first window 844 may display a presentation shared in the course of the first meeting, and may also display information which identifies participants in the first meeting. Second window 848, which may be a PIP window, is associated with a second meeting, or another in-progress meeting that the user of display screen 828 is expected to attend but is not yet attending. Second window 848 may display information which allows a user of display screen to identify when a presentation is shared during the course of the second meeting, and who is currently participating in the second meeting.

Figure 9:
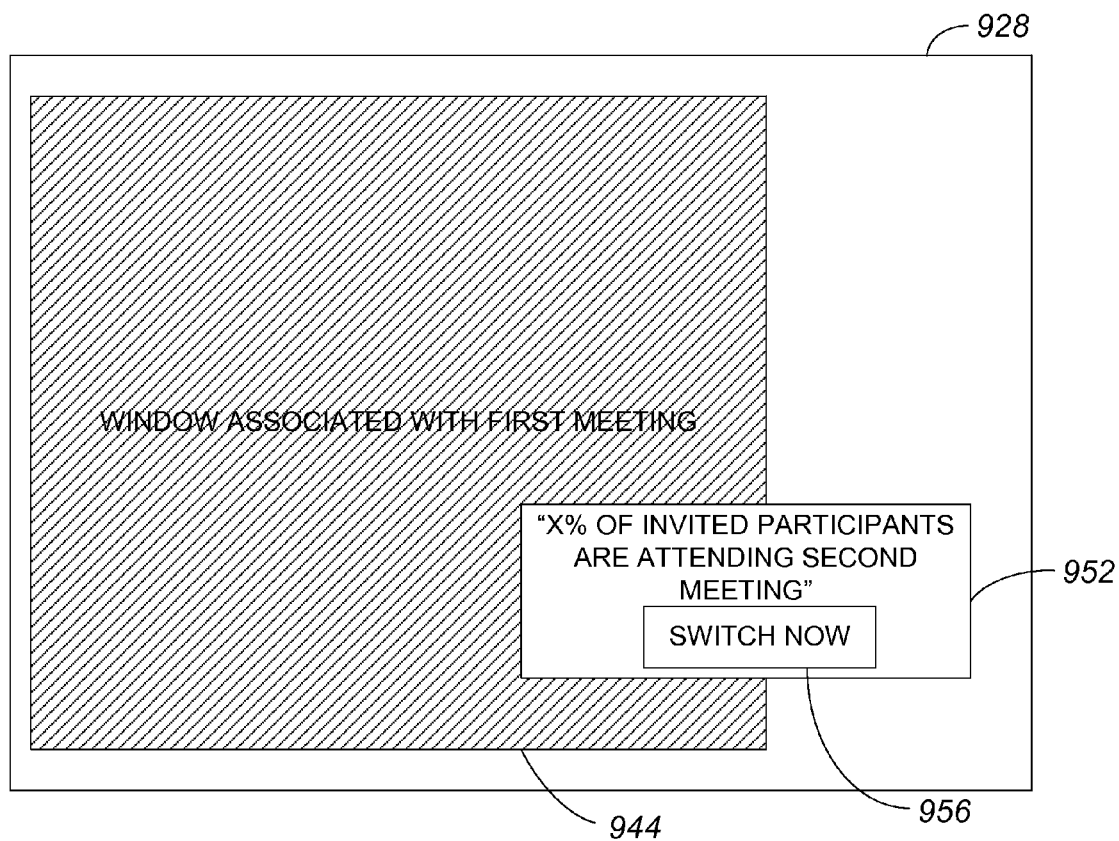
FIG. 9 is a diagrammatic representation of a display screen of an endpoint on which an interface that allows the endpoint to switch to a second meeting once a certain condition is met is displayed in accordance with an embodiment.

In lieu of, or in addition to, displaying a first window associated with a first meeting and a second window associated with a second meeting, a display screen of an endpoint used by a participant in the first meeting may display an interface which allows the participant to effectively switch from participating in the first meeting to participating in the second meeting. With reference to FIG. 9, a display screen of an endpoint on which an interface that allows the endpoint to switch to a second meeting once a certain condition is met is displayed will be described in accordance with an embodiment. A display screen 928 includes a first window 944 and an interface window 952.

First window 944 is generally arranged to display information associated with a first meeting in which a party in possession of display screen 928 is a participant. Interface window 952 may provide information relating to a condition that may cause a party in possession of display screen 928 to switch from participating in the first meeting to participating in a second meeting. In the embodiment as shown, interface window 952 provides an indication of a percentage of invited participants who are currently attending a second meeting. Based on the percentage of invited participants who are currently attending the second meeting, a party may decide when to activate a button 956 that is configured to cause the party to switch from participating in the first meeting to participating in the second meeting. It should be appreciated that although interface window 952 has been shown as providing an indication relating to a second meeting, interface window 952 is not limited to providing such an indication. Further, the indication provided in interface window 952 that relates to the second meeting may be any suitable indication, and is not limited to indicating a percentage of invited participants that are attending the second meeting. In general, the indication provided in interface window 952 may be related to a condition under which meeting participation may switch from the first meeting to the second meeting.

Figure 10:
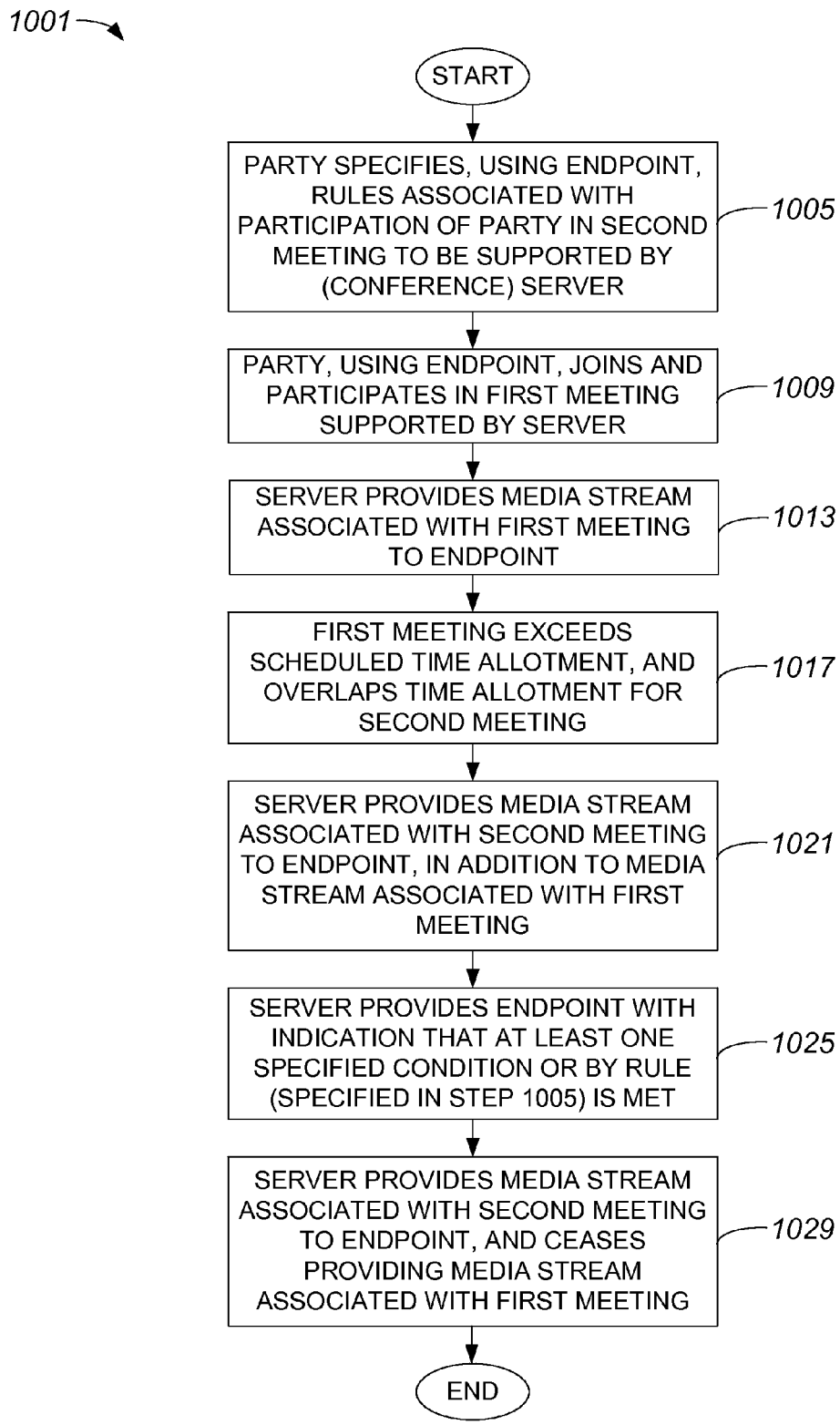
FIG. 10 is a process flow diagram which illustrates interactions between an endpoint, e.g., an endpoint associated with a user that is an invited participant in a first meeting and a second meeting, and a server in accordance with an embodiment.

A party may specify the conditions or rules that a server is to implement with respect to determining when it may be appropriate for the party to switch from participating in one meeting to participating in another meeting. FIG. 10 is a process flow diagram which illustrates interactions between an endpoint, e.g., an endpoint associated with a party or a user that is a participant in a first meeting and an invited participant in a second meeting, and a server in accordance with an embodiment. A method 1101 of interacting between an endpoint and a server begins at step 1005 in which a party, using an endpoint, specifies rules or conditions associated with a participation of the party in a second meeting supported by a server. In one embodiment, the party specifies rules or conditions which, when met or exceeded, effectively trigger a switch from participating in a first meeting to participating in a second meeting. The specified rules or conditions may apply substantially only to the second meeting, or the specified rules or conditions may apply to general conditions under which the party may switch from one meeting to another.

After the party specifies rules or conditions, the party joins and participates in a first meeting in step 1009, using the endpoint. The first meeting is supported by, e.g., hosted by, a server. In step 1013, the server provides a media stream associated with the first meeting to the endpoint. The endpoint typically presents the media stream associated with the first meeting to the party, e.g., renders the media stream associated with the first meeting for display on a display screen. The media stream associated with the first meeting may generally include audio and/or video associated with the first meeting, and may also include other information associated with the first meeting, e.g., information that identifies participants in the first meeting.

The first meeting is determined to exceed its scheduled time allotment in step 1017. When the first meeting exceeds its scheduled time allotment, the first meeting is still ongoing when a time allocation for a second meeting begins. In the described embodiment, once it is determined that the first meeting exceeds it scheduled time allotment, the server provides a media stream associated with the second meeting to the endpoint in step 1021, in addition to the media stream associated with the first meeting. It should be appreciated that, in some instances, the endpoint may join, e.g., log into, the second meeting before the media stream associated with the second meeting may be provided to the endpoint. When the endpoint obtains the media stream associated with the second meeting, the endpoint may render the media stream associated with the second meeting for display on a display screen of the endpoint, along with a rendering of the media stream associated with the first meeting.

At some point, the server determines that at least one condition specified in step 1005 has been met. As such, in step 1024, the server provides the endpoint with an indication that at least one specified condition or rule has been met. The indication may be, but is not limited to being, a visual notification that at least one specified condition or rule has been met. In one embodiment, the indication may involve the server effectuating a switch from supporting participation of the endpoint in the first meeting to supporting participation of the endpoint in the second meeting. That is, a server may effectively notify an endpoint that at least one specified condition is met by causing the endpoint to switch from participating in the first meeting to participating in the second meeting.

After the server provides the endpoint with an indication that at least one specified condition is met, process flow proceeds to step 1029 in which the server continues to provide the media stream associated with the second meeting to the endpoint, and ceases providing the media stream associated with the first meeting to the endpoint. As such, the endpoint is switched from participating in the first meeting to participating in the second meeting. Once the media stream associated with the first meeting ceases being provided to the endpoint, the method of interacting between an endpoint and a server is completed.

Although only a few embodiments have been described in this disclosure, it should be understood that the disclosure may be embodied in many other specific forms without departing from the spirit or the scope of the present disclosure. By way of example, in some instances, a condition or a trigger which would cause a participant to switch from participating in a first meeting to participating in a second meeting may not be met before the first meeting ends. That is, a first meeting which is still in progress at approximately a time at which a second meeting is to begin may end prior to a switching condition being met. When a first meeting ends prior to a switching condition being met, the participant may be switched from participating in the first meeting to participating in the second meeting.

While logic operable to utilize policy driven rules to effectively manage participation by a party in multiple meetings has generally be described as being present on a server, it should be appreciated that such logic is not limited to being present on a server. In one embodiment, logic operable to utilize policy driven rules to effectively manage participation by a party in multiple meetings may be implemented on an endpoint, or a device used by the party to participate in meetings. Alternatively, logic operable to utilize policy driven rules to effectively manage participation by a party in multiple meetings may be distributed throughout a network, e.g., on both a server and an endpoint.

For some meetings that are supported by a conference server, e.g., for some virtual meetings, multiple participants may gather in a particular location such as a conference room, and dial into the meeting using a single device. Each of the participants at the particular location may be considered to be participating in the meeting. In order to identify the participants at the particular location, as for example such that it may be determined if a particular participant is participating in the meeting from the particular location or if a predetermined percentage of participants is participating in the meeting from the particular location, various algorithms may be implemented. In one embodiment, a facial recognition or a voice recognition algorithm may be utilized to identify participants in the meeting who are at the particular location. A facial recognition algorithm may use video obtained from the particular location to identify participants in the meeting, and a voice recognition algorithm may use audio obtained from the particular location to identify participants in the meeting without departing from the spirit or the scope of this disclosure.

A media stream associated with a second meeting has been described as being presented or otherwise rendered in a window on a display screen while another window presents a media stream associated with a first meeting. In one embodiment, a media stream associated with a second meeting may be obtained, but not presented in a window. In such an embodiment, an alarm-like event may be arranged to notify a participant when a condition that is used to determine when the participant may wish to switch from participating in a first meeting to participating in the second meeting is met. The alarm-like event may be, but is not limited to being, a pop-up window with an interface which allows the participant to elect to switch from participating in a first meeting to participating in the second meeting.

In general, an endpoint used by a participant has been described as being a user portal or a device such as a computing device in which a media stream associated with a conference or a session may be rendered. It should be appreciated that an endpoint may include more than a single device. For example, an endpoint used by a participant may include a computing device on which visual information associated with a meeting is displayed, and may also include a telephonic device on which audial information associated with the meeting may effectively be presented.

In one embodiment, when a participant in a first meeting is provided with a media stream associated with a second meeting, the participant may monitor the second meeting and make a decision as to when he or she will switch from participating in the first meeting to participating in the second meeting. That is, in lieu of a server determining when to switch a participant from participating in a first meeting to participating in a second meeting, the participant may determine when to switch to participating in the second meeting. For instance, when a participant determines that a presentation is being shared in a second meeting, e.g., through monitoring video associated with a second meeting that is presented on an endpoint used by the participant, the participant may decide to switch from participating in a first meeting to participating in the second meeting.

A server may provide a participant in a first meeting with information which allows the participant to determine when he or she will switch to participating in a second meeting. By way of example, a server may provide a participant with information relating to parties that are currently participating in the second meeting, and/or information which indicates whether a presentation is currently being shared in the second meeting. The participant may use the information provided by the server to determine when to switch from participating in a first meeting to participating in the second meeting.

In some situations, a "deadlock" condition may occur. For example, a first invited participant may specify that he or she will not attend a meeting until a second invited participant joins the meeting, and the second invited participant may specify that he or she will not attend the meeting until the first invited participant joins the meeting. Deadlock may occur such that neither the first invited participant nor the second invited participant participates in the meeting, as each are awaiting the presence of the other with respect to the meeting. Any suitable method may generally be used to avoid a deadlock condition. One suitable method for avoiding a deadlock condition may include a server notifying a first invited participant that a second invited participant will participating in a meeting once the first invited participant participates, and notifying the second invited participant that the first invited participant will participate in the meeting once the second invited participant participates. Another suitable method may involve providing a status of a first invited participant to substantially all other invited participants, where the status indicates that the first invited participant is ready to participate in a meeting but has not yet joined the meeting.

The ability to intelligently decide when to cease participating in a first meeting and to begin participating in a second meeting may generally be provided to substantially all invited participants for the second meeting. It should be appreciated, however, that in some situations, the ability to intelligently decide when to cease participating in a first meeting and to begin participating in a second meeting may be provided to some but not all of the invited participants for the second meeting. By way of example, executives or very important persons (VIPs) may be provided with the ability to intelligently decide when to begin participating in a second meeting, while parties that are not executives or VIPs may not be provided with the ability to intelligently decide when to begin participating in the second meeting.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   supporting a participation of a first endpoint in a first session, wherein supporting the participation of the first endpoint in the first session includes providing a first media stream to the first endpoint, the first media stream being associated with the first session;

identifying a first time when a second session is to begin, wherein the first endpoint is expected to participate in the second session;

determining whether the first endpoint is still participating in the first session after the first time, wherein the second session is scheduled to start at the first time and the first session is scheduled to end at or before the first time but is still ongoing after the first time;

identifying a first condition when it is determined that the first endpoint is still participating in the first session after the first time, the first condition being associated with activity occurring during the second session;

determining when the first condition is met while supporting the participation of the first endpoint in the first session;

causing the first endpoint to automatically switch to participating in the second session when it is determined that the first condition is met, wherein causing the first endpoint to switch to participating in the second session when it is determined that the first condition is met includes causing the first endpoint to automatically loci into the second session when the first condition is met;

providing a second media stream to the first endpoint when it is determined that the first endpoint is still participating in the first session after approximately the first time, the second media stream being associated with the second session;

causing the first media stream to be presented on the first endpoint; and causing the second media stream to be presented on the first endpoint while the first media stream is presented on the first endpoint when it is determined that the first endpoint is still participating in the first session after approximately the first time.

2. The method of claim 1 wherein the first condition is associated with a percentage of invited participants that are participating in the second session from a particular location, and wherein determining when the first condition is met includes determining when at least the percentage of invited participants is met or exceeded.

3. The method of claim 1 wherein the first condition is associated with a participation in the second session of a particular invited participant from a particular location, and wherein determining when the first condition is met includes determining when the particular invited participant is participating in the second session from the particular location.

4. The method of claim 1 wherein the first condition is associated with a presentation, and wherein determining when the first condition is met includes determining when the presentation is shared in the second session.

5. A tangible, non-transitory computer-readable medium comprising computer program code, the computer program code, when executed, configured to:

support a participation of a first endpoint in a first session, wherein the computer program code configured to support the participation of the first endpoint in the first session is further configured to provide a first media stream to the first endpoint, the first media stream being associated with the first session;

identify a first time when a second session is to begin, wherein the first endpoint is expected to participate in the second session, wherein the second session is scheduled to start at the first time and the first session is scheduled to end at or before the first time but is still ongoing after the first time;

determine whether the first endpoint is still participating in the first session after the first time;

identify a first condition when it is determined that the first endpoint is still participating in the first session after the first time, the first condition being associated with activity occurring during the second session;

determine when the first condition is met while supporting the participation of the first endpoint in the first session;

cause the first endpoint to automatically switch to participating in the second session when it is determined that the first condition is met, wherein the computer program code configured to cause the first endpoint to switch to participating in the second session when it is determined that the first condition is metis further configured to cause the first endpoint to log into the second session;

provide a second media stream to the first endpoint, the second media stream being associated with the second session when it is determined that the first endpoint is still participating in the first session after approximately the first time;

cause the first media stream to be presented on the first endpoint; and cause the second media stream to be presented on the first endpoint while the first media stream is presented on the first endpoint when it is determined that the first endpoint is still participating in the first session after approximately the first time.

6. The tangible, non-transitory computer-readable medium comprising computer program code of claim 5 wherein the first condition is associated with a percentage of invited participants that are participating in the second session from a particular location, and wherein the computer program code configured to determine when the first condition is met is further configured to determine when at least the percentage of invited participants is met or exceeded.

7. The tangible, non-transitory computer-readable medium comprising computer program code of claim 5 wherein the first condition is associated with a participation in the second session of a particular invited participant from a particular location, and wherein the computer program code configured to determine when the first condition is met is further configured to determine when the particular invited participant is participating in the second session from the particular location.

8. The tangible, non-transitory computer-readable medium comprising computer program code of claim 5 wherein the first condition is associated with a presentation, and wherein the computer program code configured to determine when the first condition is met is further configured to determine when the presentation is shared in the second session.

9. An apparatus comprising:

a processor, the processor being arranged to execute logic embodied in a tangible medium;

a communications interface, the communications interface configured to allow the apparatus to communicate on a network, the communications interface including at least one input/output (I/O) port; and the logic, the logic operable to be executed by the processor to support a participation of a first endpoint in a first session, wherein the logic operable to support the participation of the first endpoint in the first session is operable to provide a first media stream to the first endpoint, the first media stream being associated with the first session, the logic further being operable to cooperate with the processor to cause the first endpoint to switch from participating in the first session to participating in a second session when a first condition is met, wherein the first session is ongoing when the first condition is met and the second session is scheduled to start at the first time, the first session being scheduled to end at or before the first time but is still ongoing after the first time, wherein the logic operable to cause the first endpoint to switch to participating in the second session when it the first condition is met is operable to causing the first endpoint to automatically log into the second session when the first condition is met, the logic still further being operable to provide a second media stream associated with the second session to the endpoint, the second media stream being provided while the first session is ongoing.

10. The apparatus of claim 9 wherein the logic is further operable to cooperate with the processor to determine when the first condition is met while supporting the participation of the first endpoint in the first session, the first condition being arranged to indicate when the first endpoint is to switch from participating in the first session to participating in the second session.

11. The apparatus of claim 10 wherein the first condition is one selected from a group including a percentage of invited participants that are participating in the second session, a participation of a particular invited participant in the second session, and a sharing of a presentation in the second session.

* * * * *